June 29, 1965 A. E. STRINGFELLOW ET AL 3,192,347
CIRCUIT INTERRUPTER HAVING TRACK RESISTANT COATING THEREON
Filed Jan. 10, 1962 2 Sheets-Sheet 1
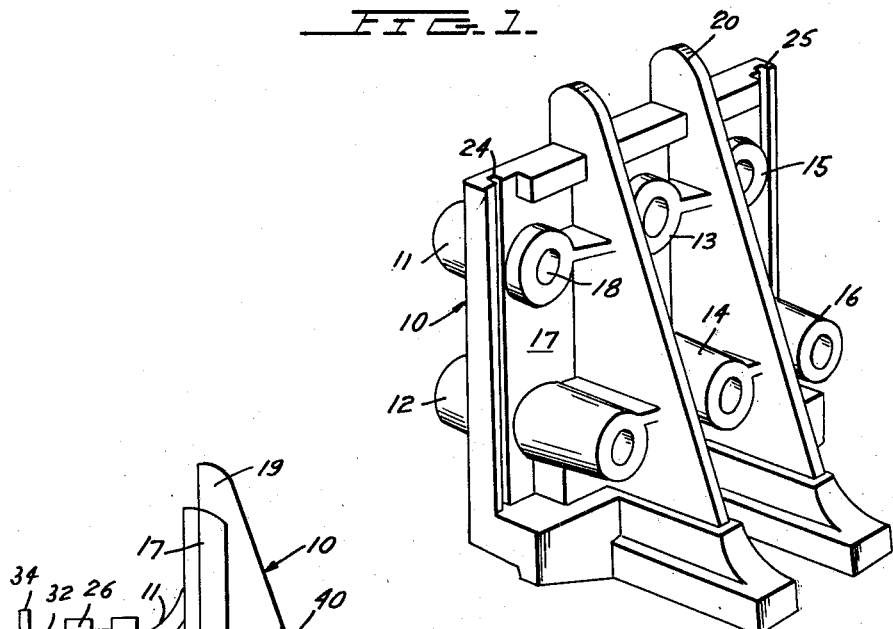
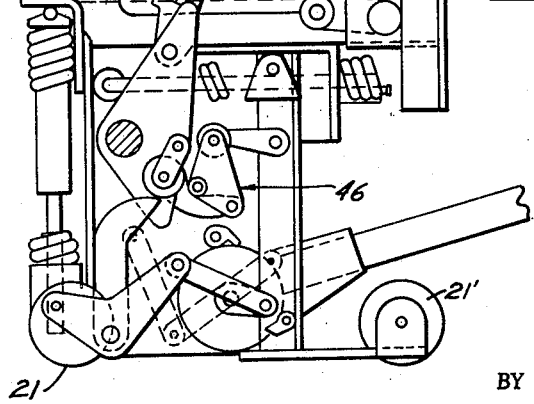
INVENTORS
ALLEN E. STRINGFELLOW
DAVID H. REIGHTER
BY
OSTROLENK, FABER, GERB & SOFFEN
ATTORNEYS June 29, 1965    A. E. STRINGFELLOW ET AL    3,192,347
CIRCUIT INTERRUPTER HAVING TRACK RESISTANT COATING THEREON
Filed Jan. 10, 1962      2 Sheets-Sheet 2
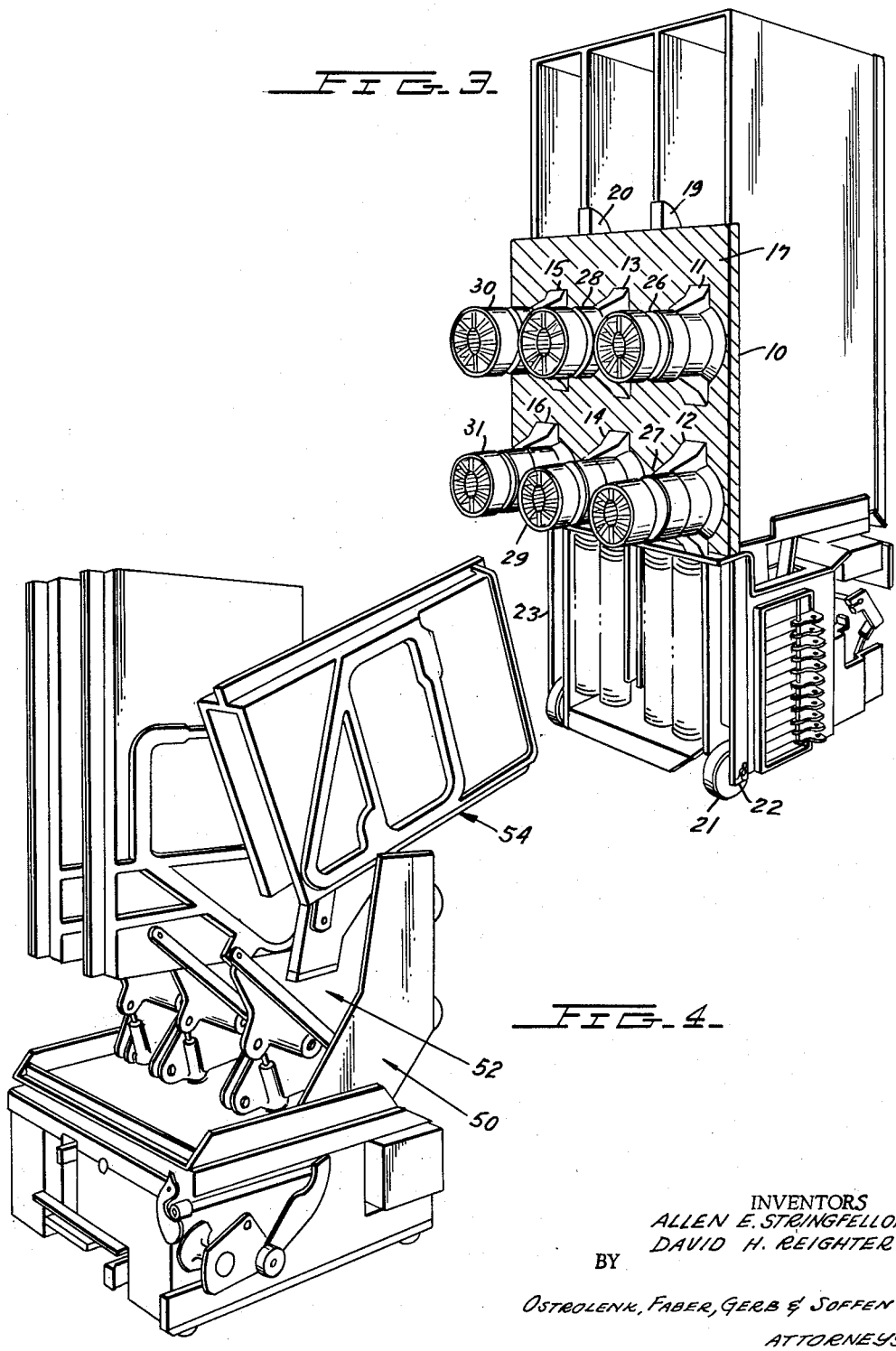
INVENTORS
ALLEN E. STRINGFELLOW
DAVID H. REIGHTER
BY
OSTROLENK, FABER, GERB & SOFFEN
ATTORNEYS

3,192,347
CIRCUIT INTERRUPTER HAVING TRACK RESISTANT COATING THEREON
Allen E. Stringfellow, Haddonfield, N.J., and David H. Reighter, Roslyn, Pa., assignors to I-T-E Circuit Breaker Company, Philadelphia, Pa., a corporation of Pennsylvania
Filed Jan. 10, 1962, Ser. No. 165,366
7 Claims. (Cl. 200—144)

This invention relates to devices and methods for providing improved anti-tracking properties in electrical apparatus. More particularly, the present invention relates to improved methods and compositions for preventing electrical conduction across the surface of the plastic or like insulation of electrical circuit interrupters and associated structures and support elements; which conduction is normally promoted by contaminants and high humidity conditions on said surfaces; and which results in burning a carbonaceous path across such surfaces.

Accordingly, it is an object of the present invention to provide in circuit interrupter apparatus improved anti-tracking properties, whether the tracking is that induced by surface creepage or power arcing. A further object is to provide non-ceramic compositions which have improved anti-tracking or arc-suppressing properties without an inversely proportionate loss of flame retardancy, as has normally occurred in plastic arc-suppressing compositions known heretofore.

Further, circuit interrupters employing the coating compositions described hereinafter obtain the desired track resistance along with an inherent and desirable flame retardance at significantly reduced costs while permitting the inclusion of pigment of any color as desired.

Anti-tracking devices prepared in accordance with this invention are coated with a composition formed from a two component epoxy resin system; one of said components containing from 28 percent to 38 percent by weight of said epoxy resin by weight of the total component composition (absent the pigment constituent where added); and 14 percent to 19 percent of the total two component composition; and each of said components, and therefore the total two component composition, as well, containing from 45 weight percent to 60 weight percent of finely powdered hydrous magnesium silicate. An aliphatic amine curing agent for the epoxy resin is also employed and is maintained separately in the component from which the epoxy resin is omitted. The proportions of curing agent utilized are in the range of about 28 percent to 38 percent of the single component mixture. There is present, additionally and normally, an organic solvent and, if desired, diluent and/or a suitable pigment. The talc or finely divided hydrous magnesium silicate must, of necessity, be substantially free of calcium. Hence, it is essential that the talc contain less than 0.2 percent by weight of said talc component of calcium in elemental or combined form. The coating deposited on a circuit interrupter as provided herein can be cured, to effect conversion of the epoxy resin to a high polymer state, either at ambient or elevated temperatures; and may be applied to the circuit interrupter in a thickness of at least .001 inch and in an optimum thickness of .003 inch with one application. This latter breadth of coating is preferred due to the combination of properties imparted and economic considerations. This coating when applied in the aforesaid thickness serves to increase the tracking resistance of phenol-formaldehyde resin, for example, from 20 seconds to 1000 seconds and that of cast epoxy resin from 500 seconds to 16,000 seconds. Thicker coatings can be applied without intermediate cures and without sagging due to thixotropy being induced. Thus, single coats of up to .010 inch and higher are thoroughly practicable. Multiple coats may, of course, be employed if desired. The thicker the coating, the more enhanced are the anti-tracking properties of the coated device, in any event.

The invention, as to its organization and mode of operation, together with further objects and advantages thereof, may best be understood by reference to the following detailed description wherein an illustrative circuit interrupter and support element which incorporates portions of the coating composition described herein is shown as follows:

FIGURE 1 shows a perspective view of a unitary molding for a three-phase draw-out unit.

FIGURE 2 shows a side cross-sectional view of the unitary molding as it is mounted on a draw-out unit.

FIGURE 3 shows a perspective view of FIGURE 2 as seen at an angle to the rear and specifically shows the connection of the disconnect contacts carried by the unitary barrier.

FIGURE 4 illustrates a further modification of a circuit interrupter for use in the practice of this invention.

Referring now to the figures, the unitary molding 10 is provided with integral tubular members 11, 12, 13, 14, 15, and 16 which extend through the rear panel section 17 and are provided with support flanges to render them more rigid on either side of the panel 17. Each of integral tubular members 11 through 16 has openings such as opening 18 in tubular member 11 which extend completely through and are adapted to receive conductor members as will be described hereinafter.

Also integral with panel 10 are two interphase barriers 19 and 20 as seen in FIGURES 1 and 2 which, as will be seen hereinafter, are adapted to extend between the stationary contact structures of the multi-phase circuit breaker of the draw-out unit.

The manner in which the unitary panel of FIGURE 1 is mounted and utilized is best seen with reference to FIGURES 2 and 3 which show the panel in connection with a draw-out circuit breaker structure. The draw-out circuit breaker structure may be of any standard and well-known type. By way of example, U.S. Patent No. 2,840,653 in the name of Caswell and entitled "Circuit Breaker Racking Mechanism" and assigned to the assignee of the present invention shows a typical type of draw-out unit which can be adapted with the rear panel described herein.

Thus, in FIGURE 2, the draw-out unit is comprised of a frame mechanism which is movable on wheels such as wheels 21 and 21'. The frame mechanism extends upwardly as illustrated by frame members 22 and 23 in FIGURE 3, and these frame members can receive the unitary molding 10 in any desired manner. By way of example, in FIGURE 1 the unitary molding is illustrated as having two vertical slots 24 and 25 which have a configuration to receive the upwardly extending frame members. The frame members are then secured in these slots in any desired manner.

The extending members 11 through 16 then support disconnect contacts 26, 27, 28, 29, 30 and 31, respectively, which are tulip type clusters of contacts and are formed in the usual manner and are adapted to cooperate with protruding cooperating contacts carried by the rear of the cubicle within which the draw-out unit is mounted.

By way of example, in FIGURE 2 stationary contacts 32 and 33 which are carried by rear wall 34 of the cubicle cooperate with disconnects 26 and 27, respectively, which are carried by the draw-out unit and are mounted within the unitary molding 10. Each of disconnects 26, 28 and 30 is then provided with an extending conductive member such as the conductive member 35 shown in dotted lines in FIGURE 2 which extends through barrier 17 and terminates on a stationary contact structure such as stationary contact structure 36 for conductor 35.

In a like manner, a conductive member extends from each of disconnects 27, 29 and 31, such as conductive member 37 shown in dotted lines in FIGURE 2 which extends from disconnect 27, and these conductors terminate on a bottom contact arm support such as contact arm support 38 for the phase associated with conductor 37.

It is to be noted that the combined disconnect contact mounted on the rear of the panel 17, the conductor extending through the openings in the panel extensions, such as opening 18 in FIGURE 1, the stationary contact structures such as stationary contact 36, and the lower contact arm support conductor 38, are all carried by panel 17 of the molding 10 and are secured thereto in any desired manner.

Disconnects 26–27, 28–29 and 30–31 are provided for a respective phase of a multi-phase unit. Each of these phases is associated with, as illustrated in FIGURE 2 for the phase including disconnects 26 and 27, a movable contact arm 39 which is pivoted on lower conductor 38 and is movable into and out of contact engagement with contact member 40 of stationary contact 36. The operating mechanism for contact 39, which is common to the movable contact arm of each of the phases, includes a plate 41 which is pivoted at pivot point 42 along with contact arm 39 and is connected at its upper end by pin 43 to contact arm 39. The rightwardly extending end of plate 41 is then pivotally connected by pin 44 to an operating shaft 45 which extends from a spring operated operating mechanism generally identified as operating mechanism 46.

The entire surface of the molding element 10, referred to hereinabove, incorporates the coating compositions of the invention.

The modification of FIGURE 4 illustrates further applications of the coating compositions described herein. Thus, the lead support molding 50, the plastic yoke element 52, and the exposed plastic surface of the arc chute shell 54 used for bonding the arc plate assembly, are coated with the instant epoxy resin-talc compositions.

It is thus evident that the operating mechanism illustrated in FIGURE 2 may be of any standard type and could, for example, be of the type fully described and illustrated in the above-noted U.S. Patent No. 2,840,653 to Caswell.

The compositions of the invention cured after spray-coating on structures such as described hereinabove are initially formed from two separate component compositions, as indicated above. The first component is one containing an epoxy resin in a percentage by weight of the component composition within the range of 28 percent to 38 percent and having a viscosity at 25° C. of from 10,000 to 20,000 centipoises (c.p.s.). The preferred epoxy resin is one prepared from bisphenol A and epichlorohydrin, having an epoxide equivalent of about 195 and a viscosity at 25° C. of about 16,000 c.p.s. Other suitable epoxy resins are those described by Lee and Neville, Epoxy Resins, Their Applications and Technology, Chapter 7, (1957), McGraw-Hill Book Company, New York, New York.

The talc constituent, finely divided native hydrous magnesium silicate, containing less than 0.2 percent of calcium in elemental or combined form, is present in an amount by weight of the component composition of 45 to 60 percent; and of the remainder, up to 100 percent total (absent any pigment present), from 2 percent to 17 percent is a liquid organic solvent, such as, for example, aromatic solvents, xylene, ortho-toluene, meta-toluene, para-toluene, and the like, as well as ethylene glycol ethers and mixtures thereof. The preferred solvent is, in fact composed of from 30 to 50 weight percent xylene, 10 percent to 20 percent by weight of ethylene glycol ethers (e.g., Cellosolve-ethylene glycol monoethyl ether); and 30 to 50 percent by weight of aromatic solvents such as, illustratively, xylol, toluol and Solvesso 100, a synthetic aromatic solvent prepared from petroleum.

A diluent may also be present in an amount up to 5 percent by weight of the component composition. This may be a butyl-glycidyl-ether having the formula

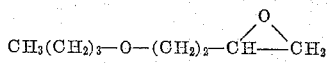

with an epoxy equivalent value of 0.7. One such product is sold by the Ciba Co. under the trademark "RD-1." A similar diluent is supplied by Jones-Dabney Co. under the trade name "Epi-Rez 501." A pigment may be present optionally and in addition, in any amount of up to 3 percent by weight. The percentages of other ingredients present are determined and recited herein in the absence of pigment.

The second component composition contains to conventional aliphatic amine curing agent such as described in the aforesaid text of Lee and Neville to effect conversion of the epoxy resin of the first component. An example of such a curing agent is sold by Jones-Dabney Co. under the trademark "Epicure 855." This is an aliphatic-amine complex reduction of an aliphatic polyamine with a mono-basic acid producing a product with both amine and amido groups having a reactive equivalent of 90. This constituent is present in stoichiometric amount, by weight equivalent to that of the resin constituent of the first component, and constitutes from 28 percent to 38 percent of the second component composition.

The same solvents are employed in the second component as described above with relation to the first component composition but in larger amounts within the range of 15 percent to 25 percent by weight.

Similarly, hydrous magnesium silicate identical with that utilized in the first component is employed within an identical range of amounts with those recited with regard thereto. The talc in each of the components is milled to a particle size as defined by use of a Hegemann fineness gage made by Precision Gage and Tool Co. of Dayton, Ohio. Component "A" and "B" must be milled on a three-roll paint mill or ball milled to a minimum fineness of .5 mil, NS No. of 7 or a paint club No. of 8.75. This fineness is a factor which determines the track resistance of the coating.

The two component mixtures are admixed in substantially equal amounts and are reduced to approximately 15 seconds viscosity employing additional solvent mixture similar to that employed in the component compositions recited above. The coating is conveniently applied to the circuit interrupter apparatus by conventional spray coating technique. It may, of course, also be applied with a brush or by other standard procedure. The curing operation which proceeds after the coating has been applied to the circuit breaker structure may be permitted to proceed at room temperature, as noted above; a method which normally requires several hours, and may thus be completed overnight; or it may proceed to completion at elevated temperatures, for briefer periods, e.g. for a period of 15 to 30 minutes at 175° F. Oven cures are thus preferred where expedition is required.

Further illustrative of the present invention is the following example of a coating composition and its application as contemplated within the purview of the present invention.

Example

A first component composition is prepared by admixture of the following ingredients:

| | Parts by weight | Percent |
|---|---|---|
| Epoxy resin formed from bisphenol A and epichlorohydrin having an epoxide equivalent of 195 and a viscosity at 25° C. of 16,000 | 600 | 33.5 |
| Butyl glycidyl ether RD-1 | 84 | 4.7 |
| Solvent; 40% xylene, 20% glycol ethyl ether (Cellosolve), 40% toluene and related aromatic solvents (Solvesso 100) having a flash point of about 100° C | 168 | 9.4 |
| Finely powdered native hydrous magnesium silicate (Treasure Talc 1736) Whitaker, Clark, and Daniels, Inc | 936 | 52.4 |
| Red pigment (Pemco NP 30) | | 2.0 |
| Total | 1,788 | 102.0 |

The second component composition was prepared as follows:

| | Parts by weight | Percent |
|---|---|---|
| Aliphatic amine curing agent for epoxy resin (J. D. Epicure 855) | 600 | 32.3 |
| Solvent mixture (same as that of the first component composition above) | 360 | 19.2 |
| Finely powdered native hydrous magnesium silicate (Treasure Talc 1736) | 900 | 48.5 |
| Total | 1,860 | 100.0 |

Equal parts of the aforesaid component mixtures are admixed, and have a pot life of eight hours. The resulting composition is reduced to 15 seconds viscosity in a suitable container No. 3 Zahn cup using additional solvent identical with that employed in the formulation of the component mixtures; sufficient solvent being added to effect the aforesaid viscosity. The resulting composition is then introduced into a standard spray container and sprayed on the molding 10 including the panel 17 and two interphase barriers 19 and 20 of the circuit interrupter as seen in FIGURES 1 and 2. The apparatus is cured at room temperature by standing overnight. Completion of the curing step is indicated by dryness to touch.

What is claimed is:

1. In an electrical circuit interrupter, molded plastic insulation subject to tracking, having deposited thereon a track-resistant coating comprising at least 45% by weight of hydrous magnesium silicate containing less than 0.2% by weight calcium, and a cured epoxy resin polymer.

2. In an electrical circuit interrupter, a molded plastic insulation subject to tracking having cured thereon a track-resistant coating prepared from two component compositions; each of said compositions containing from 45% to 60% by weight of finely divided hydrous magnesium silicate containing less than 0.2% by weight of elemental and combined calcium, and from 28% to 38% of epoxy resin in one of said components.

3. In an electrical circuit interrupter, a molded plastic insulation subject to carbon tracking, and cured thereon a coating prepared from two component compositions; each of said components containing from 45% to 60% by weight of finely divided hydrous magnesium silicate containing less than 0.2% by weight of calcium in elemental and combined form; and at least one of said components containing from 28% to 38% by weight of an epoxy resin having, in the uncured state, a viscosity at 25° C. of at least 10,000 centipoises.

4. In an electrical circuit interrupter, a molded plastic insulation subject to carbon tracking; and cured thereon a track-resistant coating at least 0.001 inch in thickness prepared from two component compositions admixed in substantially equal parts, each of said components containing from 50% to 60% by weight of finely divided hydrous magnesium silicate containing less than 0.2% by weight of calcium in elemental and combined form, one of said components including from 28% to 38% by weight of an epoxy resin having, in an uncured state, a viscosity of from 10,000 to 20,000 centipoises at 25° C., the other of said components containing an aliphatic amine epoxy curing agent.

5. In an electrical circuit interrupter, a unitary panel element and interphase barriers, formed of molded plastic resin and subject to carbon tracking; and cured thereon a coating from 0.001 to 0.010 inch in thickness prepared from two component compositions admixed in substantially equal parts, each of said components containing from 50% to 60% by weight of finely divided hydrous magnesium silicate and including less than 0.2% by weight of calcium in elemental and combined form, and in which one of said components contains from 28% to 38% by weight of an epoxy resin having, in the uncured state, a viscosity at 25° C. of from 10,000 to 20,000 centipoises, and in which the other of said components contains an aliphatic amine epoxy curing agent.

6. An electrical circuit interrupter having a molded plastic insulation subject to tracking, and deposited thereon a track-resistant coating comprising from 45% to 60% by weight of finely divided hydrous magnesium silicate, containing less than 0.2% by weight calcium in elemental and combined form, in admixture with a cured epoxy resin.

7. The circuit interrupter defined in claim 6, in which the epoxy resin of said track-resistant coating has, in the uncured state, a viscosity of from 10,000 to 20,000 centipoises at 25° C., and in which said coating contains an aliphatic amine curing agent for said epoxy resin.

References Cited by the Examiner

UNITED STATES PATENTS

| 2,240,007 | 4/41 | Power. |
| 2,645,693 | 7/53 | Cole et al. _____ 200—144 |
| 2,934,683 | 4/60 | Durst et al. _____ 260—37 X |
| 2,997,527 | 8/61 | Kessel et al. _____ 174—137 |

FOREIGN PATENTS

| 1,234,714 | 5/60 | France. |

LARAMIE E. ASKIN, *Primary Examiner.*

JOHN P. WILDMAN, *Examiner.*